US008979272B2

(12) United States Patent
Roth (10) Patent No.: US 8,979,272 B2
(45) Date of Patent: Mar. 17, 2015

(54) MULTI-PRIMARY COLOR DISPLAY (75) Inventor: Shmuel Roth, Petach Tikva (IL)

(73) Assignee: Samsung Display Co., Ltd. (KR)

( * ) Notice: Subject to any disclaimer, the term of this patent is extended or adjusted under 35 U.S.C. 154(b) by 1780 days.

(21) Appl. No.: 11/791,795

(22) PCT Filed: Nov. 28, 2005

(86) PCT No.: PCT/IL2005/001266
§ 371 (c)(1),
(2), (4) Date: Apr. 17, 2008

(87) PCT Pub. No.: WO2006/056995
PCT Pub. Date: Jun. 1, 2006

(65) Prior Publication Data
US 2008/0259224 A1 Oct. 23, 2008

Related U.S. Application Data (60) Provisional application No. 60/631,183, filed on Nov. 29, 2004.

(51) Int. Cl.
G03B 21/00 (2006.01)
G03B 33/04 (2006.01)
H04N 9/31 (2006.01)

(52) U.S. Cl.
CPC .............. *G03B 33/04* (2013.01); *H04N 9/3105* (2013.01)
USPC .................................. 353/20; 353/33; 353/81

(58) Field of Classification Search
USPC ........... 353/20, 31, 33, 34, 38, 81, 94, 98, 99, 353/121, 122; 349/5, 6, 7, 8, 9, 10
See application file for complete search history.

(56) References Cited

U.S. PATENT DOCUMENTS

| 5,605,390 A | 2/1997 | Brice et al. |
| 6,273,567 B1 | 8/2001 | Conner et al. |
| 6,870,523 B1 | 3/2005 | Ben-David et al. |

(Continued)

FOREIGN PATENT DOCUMENTS

| WO | WO 2004/010407 | 1/2004 |
| WO | WO 2005/013193 | 2/2005 |

OTHER PUBLICATIONS

International Search Report for International Application No. PCT/IL05/01266 mailed Jul. 7, 2008.

*Primary Examiner* — Sultan Chowdhury
*Assistant Examiner* — Bao-Luan Le
(74) *Attorney, Agent, or Firm* — Innovation Counsel LLP (57) ABSTRACT Embodiments of the present invention provide a method, apparatus and system of producing a color image using four or more primary colors. The apparatus, according to some demonstrative embodiments of the invention, may include four or more transmissive spatial light modulators to modulate four or more, respective, primary color light beams in accordance with four or more, respective, primary color image components of the color image to produce four or more, respective, modulated light beams; and a beam combiner to combine the four or more modulated light beams into a combined light beam carrying the color image. The beam combiner may include, for example, an X-cube to jointly direct three of the four or more modulated light beams; and a selective color rotator to rotate the polarization of two of the three modulated light beams, while maintaining the polarization of a third one of the three modulated light beams. Other embodiments are described and claimed.

20 Claims, 6 Drawing Sheets

(56) References Cited

U.S. PATENT DOCUMENTS

| | | | |
|---|---|---|---|
| 7,081,997 B2* | 7/2006 | Sedlmayr | 359/487.04 |
| 7,270,416 B2* | 9/2007 | Yamanaka et al. | 353/20 |
| 7,327,521 B2* | 2/2008 | Tani | 359/629 |
| 7,417,799 B2* | 8/2008 | Roth | 359/634 |
| 7,872,216 B2* | 1/2011 | Miyazawa | 250/208.1 |
| 7,918,560 B2* | 4/2011 | Miyazawa | 353/20 |
| 7,959,299 B2* | 6/2011 | Miyazawa | 353/34 |
| 7,973,750 B2* | 7/2011 | Miyazawa | 345/87 |
| 8,425,043 B2* | 4/2013 | Miyazawa | 353/20 |
| 2003/0067586 A1* | 4/2003 | Chigira et al. | 353/20 |
| 2004/0075817 A1* | 4/2004 | Agostinelli et al. | 353/34 |
| 2004/0130682 A1* | 7/2004 | Tomita | 353/31 |
| 2004/0145711 A1* | 7/2004 | Takezawa et al. | 353/122 |
| 2005/0134813 A1* | 6/2005 | Yoshikawa et al. | 353/122 |
| 2005/0185139 A1* | 8/2005 | Yamanaka et al. | 353/20 |
| 2006/0001984 A1* | 1/2006 | Tani | 359/726 |
| 2006/0038961 A1* | 2/2006 | Pentico et al. | 353/31 |
| 2006/0238665 A1* | 10/2006 | Stahl et al. | 349/5 |
| 2006/0244920 A1* | 11/2006 | Kawaai | 353/20 |
| 2006/0285217 A1* | 12/2006 | Roth | 359/634 |
| 2007/0035700 A1* | 2/2007 | Stahl et al. | 353/20 |
| 2007/0182933 A1* | 8/2007 | Sudo et al. | 353/20 |
| 2008/0259231 A1* | 10/2008 | Miyazawa | 349/8 |
| 2008/0304016 A1* | 12/2008 | Miyazawa | 353/20 |
| 2009/0002633 A1* | 1/2009 | Miyazawa | 353/20 |
| 2009/0009724 A1* | 1/2009 | Miyazawa | 353/31 |
| 2009/0141243 A1* | 6/2009 | Suzuki | 353/20 |
| 2009/0147031 A1* | 6/2009 | Miyazawa | 345/690 |
| 2009/0161073 A1* | 6/2009 | Kobayashi et al. | 353/20 |
| 2010/0225885 A1* | 9/2010 | Miyazawa | 353/20 |

* cited by examiner

FIG. 1

Related Art

MULTI-PRIMARY COLOR DISPLAY

CROSS-REFERENCE TO RELATED APPLICATIONS

This application is a National Phase Application of PCT International Application No. PCT/IL2005/001266entitled "MULTI-PRIMARY COLOR DISPLAY", International Filing Date Nov. 28, 2005, published on Jun. 1, 2006 as International Publication No. WO 2006/056995, which in turn claims priority from U.S. Provisional Patent Application No. 60/631,183, filed Nov. 29, 2004, both of which are incorporated herein by reference in their entirety.

FIELD OF THE INVENTION

The invention relates generally to color display devices and methods of displaying color images and, more particularly, to multi-primary color displays using transmissive Spatial Light Modulators (SLMs).

BACKGROUND

Various types of color display technologies are known in the art. For example, there are CRT display systems, LCD systems, and projection display systems. In front projection displays, the projected images are viewed from a reflective viewing screen. In rear projection displays, the projected images are viewed through a transmissive viewing screen.

To produce color images, existing display devices use three primary colors, typically, red green and blue, collectively referred to as RGB. In simultaneous projection display systems, the three primary color components of the image are modulated and displayed simultaneously using one or more Spatial Light Modulators (SLMs).

Figure 1:
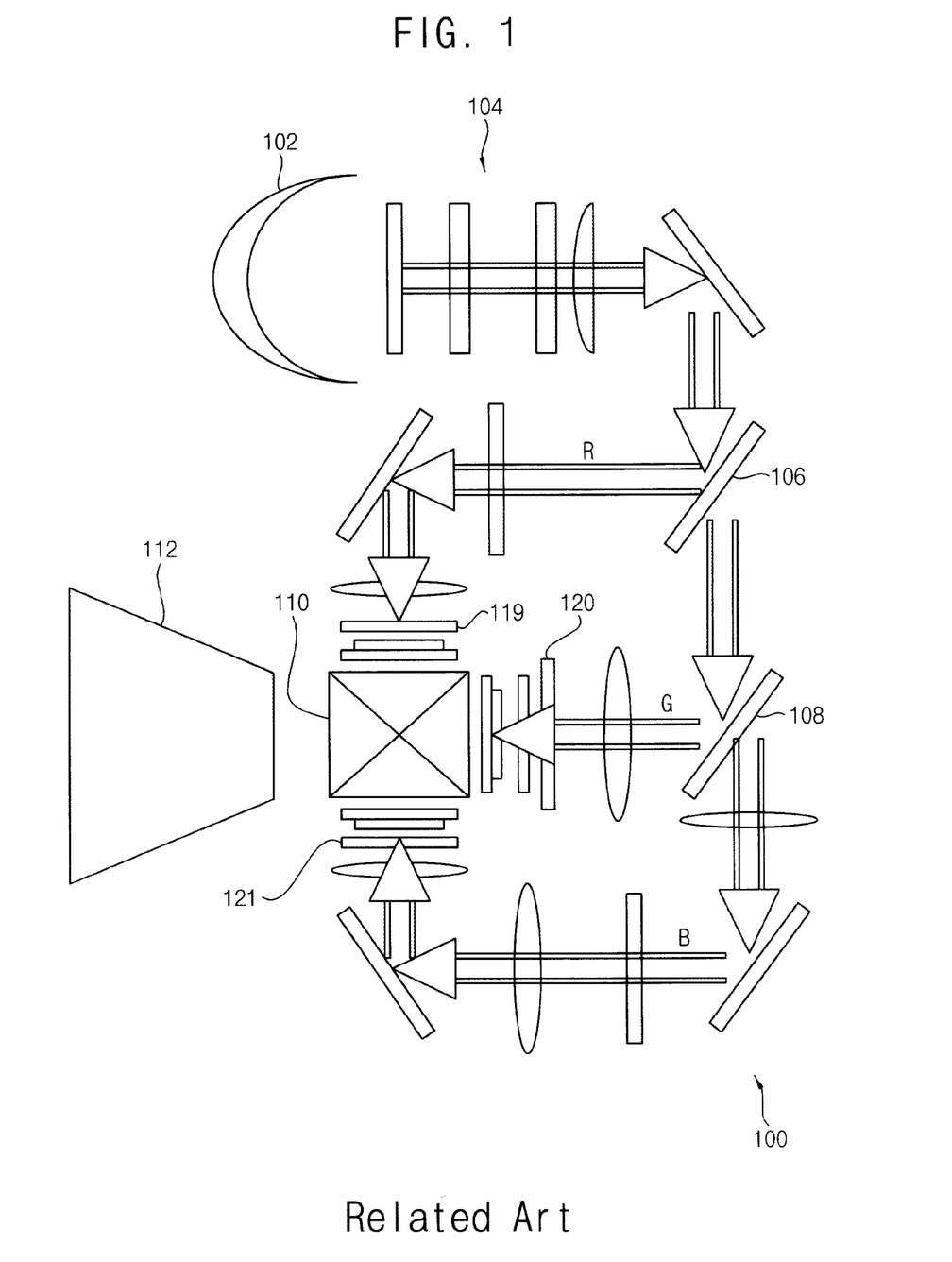
FIG. 1 is a schematic illustration of an optical configuration of a conventional RGB display device.

FIG. 1 schematically illustrates an optical configuration 100 of a RGB display device implementing three transmissive Liquid Crystal Display (LCD) panels to produce a color image. The light from a lamp 102 passes through a combination 104 of IR/UV cutoff filters, an integrator and polarizing conversion system, and a lens, to obtain an s-polarized white light beam. This beam is split into three color channels using two dichroic mirrors. A first dichroic mirror 106 reflects the red part, while passing the blue and green parts of the spectrum; and a second dichroic mirror 108 separates the green part from the blue part. Each of the colored beams may pass through an additional color filter to obtain a better definition of its color. The three colored beams are then imaged on three LC spatial light modulators, 119, 120, and 121, respectively, to create three primary images, respectively. The three modulated primary images are then combined using a standard "X cube" 110. The combined images are then projected on a screen by a projection lens 112.

Since cube 110 is designed to reflect the red and blue s-polarization beams, and to transmit the green p-polarization beam; and since the illumination path carries s-polarized light, the polarization of the green beam has to be rotated to p-polarization before X-cube 110. This is done by inserting a polarization rotating plate after modulator 120.

SUMMARY OF SOME DEMONSTRATIVE EMBODIMENTS OF THE INVENTION

Some demonstrative embodiments of the invention include a method, device, and/or system of producing a color image using four or more primary colors.

According to some demonstrative embodiments of the invention, the device may include four or more transmissive spatial light modulators to modulate four or more, respective, primary color light beams in accordance with four or more, respective, primary color image components of the color image to produce four or more, respective, modulated light beams. The device may also include a beam combiner to combine the four or more modulated light beams into a combined light beam carrying the color image.

According to some demonstrative embodiments of the invention, the beam combiner may include an X-cube to jointly direct three of the four or more modulated light beams; and a selective color rotator to rotate the polarization of two of the three modulated light beams, while maintaining, for example, the polarization of a third one of the three modulated light beams.

According to some demonstrative embodiments of the invention, the combiner may also include a dichroic polarizing beam splitter to combine a fourth modulated light beam of the four or more modulated light beams with the three modulated light beams.

According to some demonstrative embodiments of the invention, at least one of the transmissive spatial light modulators may include, for example, a transmissive liquid crystal display panel.

According to some demonstrative embodiments of the invention, the four or more primary color light beams may have, for example, spectral ranges corresponding to the four or more primary colors, respectively.

According to some demonstrative embodiments of the invention, the four or more primary colors may include at least blue, green, red and yellow.

According to some demonstrative embodiments of the invention, the device may also include a spectrum-splitting arrangement to split light of an illumination source into the four or more primary color light beams.

According to some demonstrative embodiments of the invention, the spectrum-splitting arrangement may include, for example, a plurality of dichroic mirrors to separate light of the illumination source into the four or more primary color light beams.

According to some demonstrative embodiments of the invention, the spectrum splitting arrangement may include a selective color rotator to rotate the polarization of a first part of the light of the illumination source having a spectral range corresponding to a first primary color of the four or more primary colors, and to maintain the polarization of a second part of the light of the illumination source having a spectral range corresponding to a second primary color of the four or more primary colors. The splitting arrangement may also include a polarized beam splitter to reflect the first part of the light, and to transmit the second part of the light.

According to some demonstrative embodiments of the invention, the device may include one or more folding mirrors to direct one or more of the four or more primary color light beams onto one or more of the transmissive spatial light modulators.

According to some demonstrative embodiments of the invention, the four more modulated light beams may travel substantially the same distance in the combiner.

According to some demonstrative embodiments of the invention, the device may include a projection lens to project the combined light beam onto a screen.

According to some demonstrative embodiments of the invention, the device may include a controller to separately activate each of the four or more spatial light modulators to produce four or more respective transmissive patterns corresponding to four or more primary components, respectively, of a signal representing the color image.

According to some demonstrative embodiments of the invention, the device may include a converter to convert a three-primary color input signal into the signal representing the color image.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF DEMONSTRATIVE EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Figure 2:
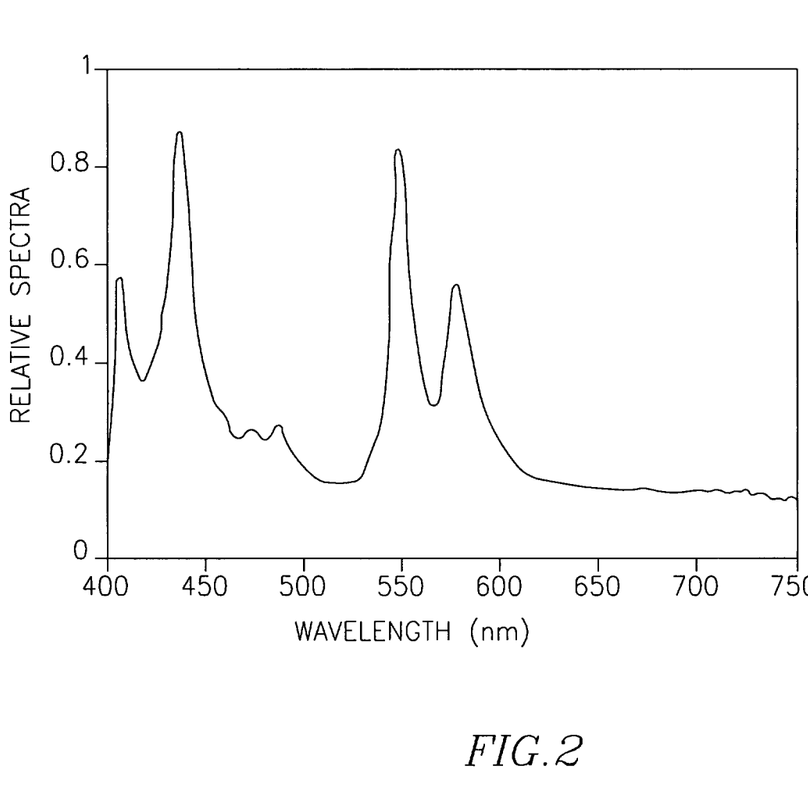
FIG. 2 is a schematic illustration of the spectral output of a conventional high-pressure mercury lamp.

The following description of non-limiting embodiments of the invention relates to a projection display system using a high-pressure mercury lamp, e.g., a UHP™ 100 Watt lamp, available from Philips Lighting, a division of Royal Philips Electronics of Eindhoven, Netherlands ("Philips UHP"), or any other suitable light source having a similar spectral range. FIG. 2 schematically illustrates the spectral output of the Philips UHP lamp. It will be appreciated that other types of high-pressure mercury lamps may have similar spectra and/or similar designs, and therefore the following examples may apply to many other types of lamps, for example, the VIP lamp available from Osram of Berlin, Germany.

The examples herein are described in the context of high-pressure mercury type lamps because such lamps are commonly used in projection display devices. However, other types of light sources, for example, Xenon (Xe) type light sources, as are known in the art, may be used.

Embodiments of monitors and display devices with more than three primaries, in accordance with demonstrative embodiments of the invention, are described in U.S. patent application Ser. No. 09/710,895, entitled "Device, System And Method For Electronic True Color Display", filed Nov. 14, 2000, now U.S. Pat. No. 6,870,523 (Reference 1), and in International Application PCT/IL03/00610, filed Jul. 24, 2003, entitled "High Brightness Wide Gamut Display" and published Jan. 29, 2004 as PCT Publication WO 2004/010407 (Reference 2), the entire disclosures of all of which are incorporated herein by reference.

Figure 3:
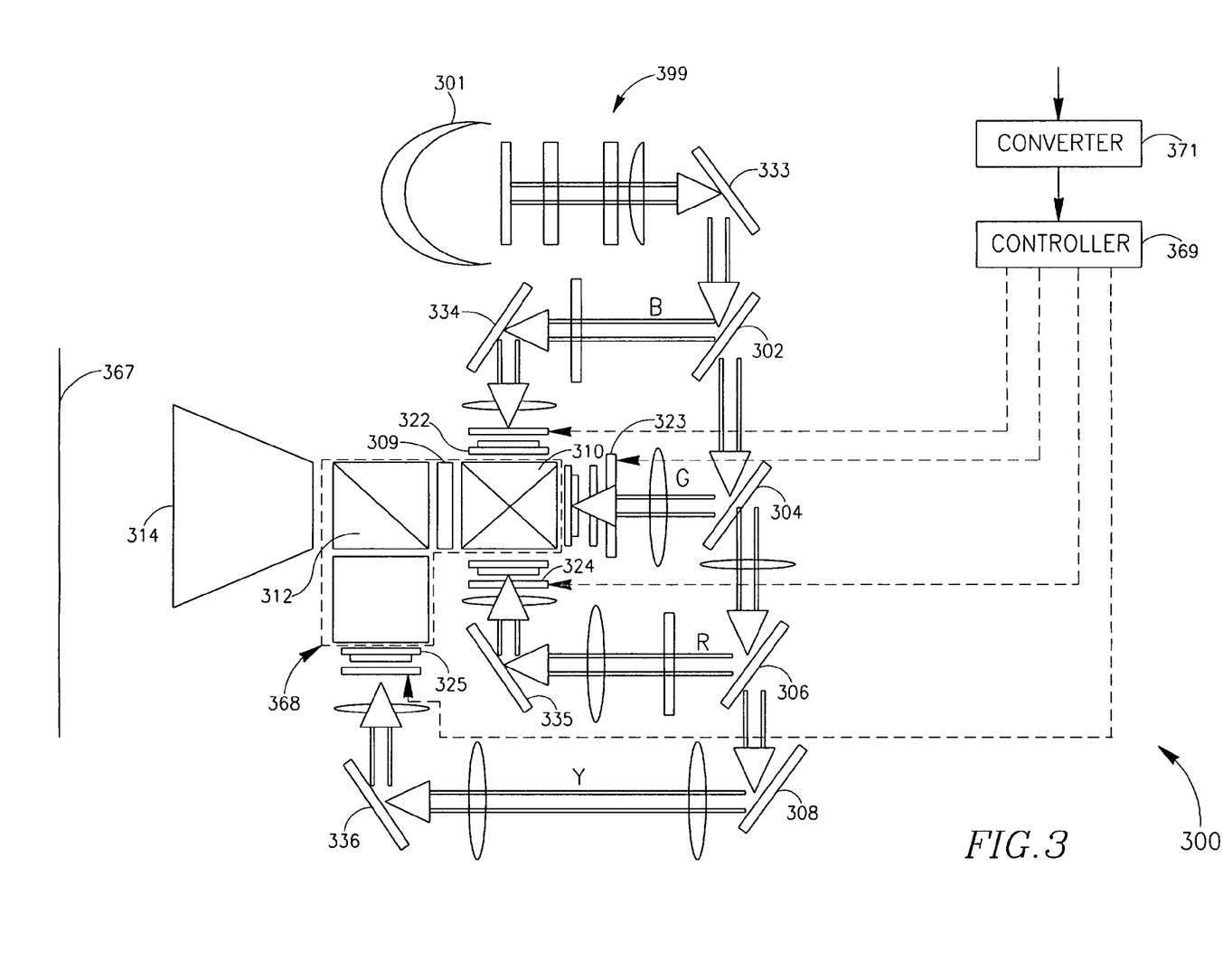
FIG. 3 is a schematic illustration of an optical configuration of a four primary color display device including a combiner in accordance with a demonstrative embodiment of the invention.

FIG. 3 schematically illustrates an optical configuration of a display device 300 in accordance with a demonstrative embodiment of the invention.

Although the invention is not limited in this respect, the demonstrative configuration of FIG. 3 may be adapted for devices using four transmissive Spatial Light Modulators (SLMs), e.g., transmissive Liquid Crystal Display (LCD) panels, wherein each panel may produce one primary-color image component, as described below.

According to some demonstrative embodiments of the invention, device 300 may include an illumination unit 301, which may include any suitable light source known in the art, e.g., a white light source as described above. Illumination unit 301 may also include a polarization conversion system 399 to provide a desired linear polarized light beam, e.g., an s-polarized light beam as is known in the art.

According to some demonstrative embodiments of the invention, device 300 may also include an optical arrangement to split the light of illumination unit 301 into four primary-color light beams, and to direct, e.g., reflect, the four primary color light beams to four transmissive SLMs, e.g., four transmissive LCD panels 322, 323, 324 and 325, respectively, as described below.

Although the invention is not limited in this respect, the optical arrangement may include, for example, three dichroic mirrors 302, 304 and 306, and five folding mirrors 333, 334, 335, 308, and 336, respectively, as described below. It will be appreciated by those skilled in the art that that any other arrangement may be used for producing and/or spatially modulating the four primary-color light beams. For example, any suitable SLM configuration may be used instead of LCD panels 322, 323, 324 and/or 325. Additionally or alternatively, any suitable splitting arrangement may be implement to split the light of illumination unit 301 into two or more of the four primary-color light beams and/or to direct the primary color light beams onto the SLMs.

According to some demonstrative embodiments of the invention, device 300 may also include a combiner 368 to combine modulated primary-color light beams transmitted by panels 322, 323, 324 and 325 into a combined light beam, as described below. The combined light beam may be projected onto a screen 367, e.g., using a projection lens 314.

According to the demonstrative embodiments illustrated in FIG. 3, each of dichroic mirrors 302, 304, and 306 may be adapted to reflect a part of the light having a spectral range corresponding to one of the four primary colors, and to transmit the remaining part of the light, as is known in the art. Thus, according to these embodiments, dichroic mirrors 302, 304 and 306 may be arranged to provide each of the transmissive LCD panels with a light beam having a spectral range corresponding to one of the four primary colors, e.g., as described below.

According to some demonstrative embodiments of the invention, folding mirror 333 may direct the polarized light beam produced by illumination unit 301 to dichroic mirror 302. Dichroic mirror 302 may be adapted to reflect a part of the polarized light beam having a spectral range corresponding to a first primary color, e.g. blue. Dichroic mirror 302 may transmit the remaining part of the light beam, whose spectral range may not cover the first primary color. Folding mirror 334 may reflect the light beam reflected by mirror 302, e.g., the blue light beam, towards panel 322.

According to some demonstrative embodiments of the invention, dichroic mirror 304 may be adapted to reflect a part of the light transmitted by mirror 302, having a spectral range corresponding to a second primary color, e.g. green, towards panel 323. Dichroic mirror 304 may transmit the remaining part of the light beam, whose spectral range may not cover the first and second primary colors.

According to some demonstrative embodiments of the invention, dichroic mirror 306 may be adapted to reflect a part of the light transmitted by mirror 304, having a spectral range corresponding to a third primary color, e.g. red. Dichroic mirror 306 may transmit the remaining part of the light beam, which may have a spectral range substantially corresponding to a fourth primary color, e.g. yellow. Folding mirror 335 may be arranged to reflect the light beam reflected by mirror 306 towards panel 324. Folding mirrors 308 and 336 may be arranged to reflect the light beam transmitted by mirror 306 towards panel 325.

According to some demonstrative embodiments of the invention, one or more of panels 322, 323, 324 and 325 may include an array of pixels, as is known in the art, which may be selectively activated to produce a transmissive pattern corresponding to one of a plurality of primary color images. In the example described herein, one or more transmissive panel may be separately activated by a controller 369 to produce a transmissive pattern corresponding to one of four independent primary color images, in accordance with an input signal representing a four-primary-color image. Such an input signal may be generated using any of the methods described in Reference 1 and/or Reference 2, e.g., using a converter 371 for converting a three-primary-color image signal into a four-primary-color image signal. Each transmissive pattern may modulate a corresponding primary color light beam to produce a corresponding primary color image component.

According to some demonstrative embodiments of the invention, one or more pixels of transmissive panels 322, 323, 324 and 325, when activated to an "on" state, may allow transmittance of polarized light, as is known in the art. Accordingly, pixels of transmissive panels 322, 323, 324 and 325, when at an "off" state, may substantially block transmittance of polarized light, as is known in the art. Thus, in accordance with these embodiments of the invention, panels 322, 323, 324 and 325 may be controlled, e.g., as described above, to produce four modulated primary color light beams, respectively, carrying four, respective, primary color image components. For example, controller 369 may control panel 322 to modulate the first primary color light beam, e.g., the blue light beam, to produce a first, e.g., blue, modulated light beam; panel 323 to modulate the second primary color light beam, e.g., the green light beam, to produce a second, e.g., green, modulated light beam; panel 324 to modulate the third primary color light beam, e.g., the red light beam, to produce a third, e.g., red, modulated light beam; and/or panel 325 to modulate the fourth primary color light beam, e.g., the yellow light beam, to produce a fourth, e.g., yellow, modulated light beam.

According to some demonstrative embodiments of the invention, combiner 368 may include an "X-cube" 310 to combine and/or jointly direct the first second and third modulated light beams received from panels 322, 323, and 324, respectively.

According to some demonstrative embodiments of the invention, X-cube 310 may have transmission and/or reflection properties resulting in a relatively high efficiency reflection for s-polarized light having a spectrum corresponding to the first and/or third primary colors, e.g., the blue and/or red primary colors; and a relatively high efficiency transmission for p-polarized light having a spectrum corresponding to the second primary color, e.g., the green primary color. Thus, it may be desired, for example, to provide X-cube 310 with the first and third modulated light beams in s-polarization, and the third modulated light beam in p-polarization, e.g., in order to achieve a relatively high efficiency of transmitting the green modulated light beam, and/or reflecting the red and/or blue modulated light beams.

According to some demonstrative examples of the invention, panel 323 may be configured to rotate the polarization of the transmitted second primary color light beam from s-polarization to p-polarization; and/or panels 322 and/or 324 may be configured to maintain the polarization of the transmitted first and/or third primary color light beams, respectively. For example, one or more pixels of panel 323, when activated to an "on" state, may allow transmittance of the green light beam, while rotating the polarization of the transmitted light to p-polarization. One or more pixels of panel 322 and/or 324, when activated to an "on" state, may allow transmittance of the blue and/or red light beam, respectively, while maintaining the polarization of the transmitted light. Accordingly, X-cube 310 may combine and/or jointly direct s-polarized red light beam received from panel 324, s-polarized blue light received from panel 322, and p-polarized green light received from panel 323.

According to some demonstrative embodiments of the invention, combiner 368 may also include a selective color rotator 309 to selectively rotate the polarization of the first and third modulated light beams, while maintaining the polarization of the second modulated light beam. For example, rotator 309 may include a green-magenta rotator to rotate the polarization of the blue and red (magenta) modulated light beams from s-polarization to p-polarization, while maintaining the polarization of the p-polarized green modulated light beam. Color rotator 309 may include any suitable color rotator, e.g., the ColorSelect® rotator manufactured by ColorLink, Inc., 5335 Sterling Dr Suite B, Boulder, Colo., 80301, USA.

According to some demonstrative embodiments of the invention, combiner 368 may also include a dichroic Polarizing Beam Splitter (PBS) 312 to combine the fourth modulated light beam received from panel 325, with the first, second and third modulated light beams from rotator 322. For example, PBS 312 may include a dichroic PBS cube to reflect the s-polarized yellow modulated light beam, and to transmit the p-polarized red, green, and blue modulated light beams. PBS 312 may include any suitable beam splitter or combiner, e.g., as are known in the art.

Thus, according to some demonstrative embodiments of the invention, combiner 368 may direct a combination of the modulated light beams of panels 322, 323, 324, and 325 towards projection lens 314.

Although the invention is not limited in this respect, combiner 368 may be configured such that all four modulated light beams may travel substantially the same distance within combiner 368.

According to some demonstrative embodiments of the invention, projection lens 315 may project the combined light beam, for example, including all four modulated color light beams, e.g., including all four primary color image components, onto viewing screen 367.

According to some demonstrative embodiments of the invention, lens 314, may have a relatively large back focal length projection lens and/or a generally similar F number compared to the lens of the device of FIG. 1.

Part of the discussion herein may relate, for demonstrative purposes, to a combiner, e.g., combiner 368, including one or more prism blocks for combining four or more modulated colored light beams. However, embodiments of the invention are not limited in this regard, and may include, for example, a combiner including, alternatively or additionally, one or more optical elements, optical units, optical blocks, optical surfaces, optical polarization elements, prism surfaces, prism elements, glass elements, dichroic elements, dichroic surfaces, or the like, e.g., as described below.

It will be appreciated by those skilled in the art, that there are many other possible configurations for implementing combiner 368. It will also be appreciated by those skilled in the art that the number and/or arrangement of the dichroic mirrors, the folding mirrors, and/or the SLM panels illustrated in FIG. 3 represent only one of many possible arrangements, and that any other suitable arrangement may be used.

According to some demonstrative embodiments of the invention, dichroic mirror 306 may be placed between relay lenses that have a relatively low F number. As a result, the cone of the light may have a relatively wide angle, which may affect, in some cases, the spectral transmission of dichroic mirror 306. This may result in a non-uniform color across the third and fourth primary color light beams, e.g., the yellow and red light beams. According to some demonstrative embodiments of the invention, a polarizing arrangement may be used, e.g., instead of dichroic mirror 306, as described in detail below.

Figure 4:
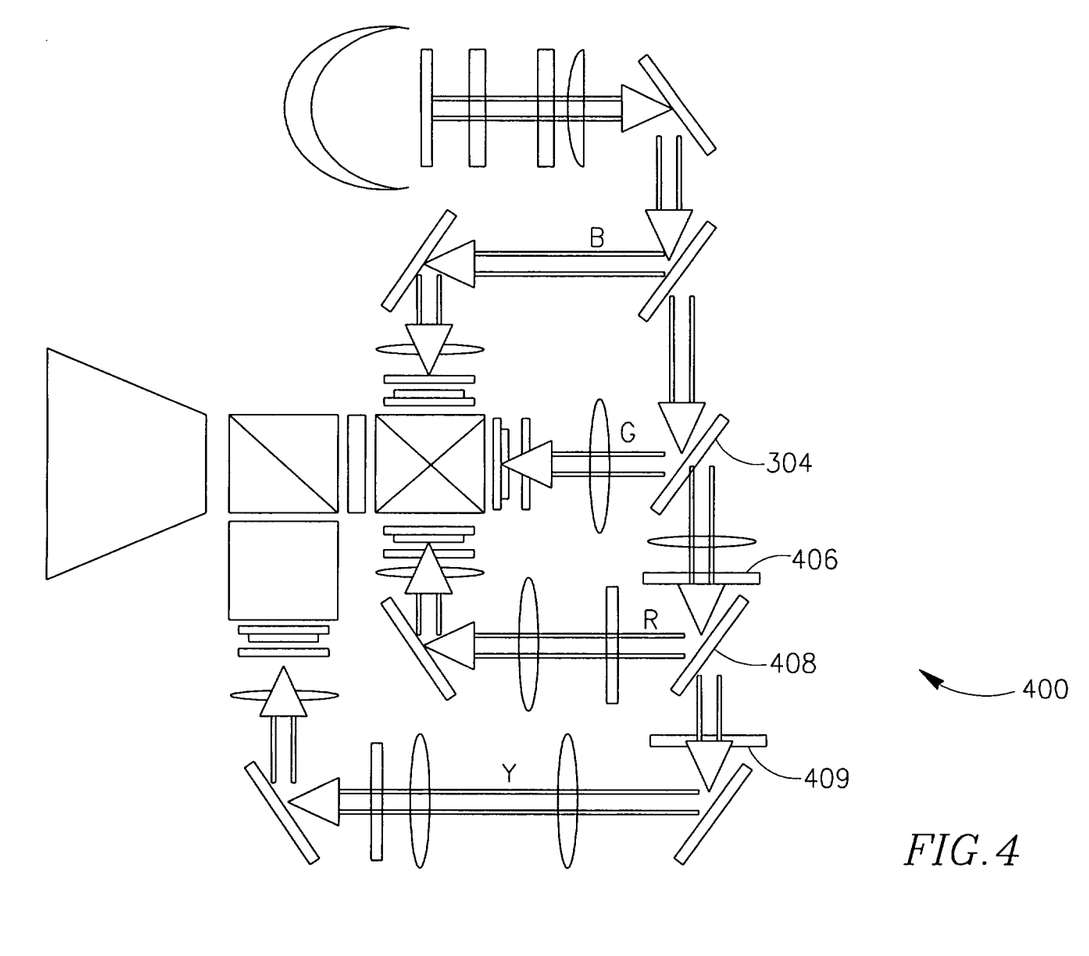
FIG. 4 is a schematic illustration of an optical configuration of a four primary color display device including a combiner in accordance with another demonstrative embodiment of the invention.

FIG. 4 schematically illustrates an optical configuration of a display device 400 in accordance with another demonstrative embodiment of the invention.

According to the demonstrative embodiment of FIG. 4, one or more elements of device 400 may be analogous to the elements of device 300. However, device 400 may include a selective color rotator 406, a PBS 408, and/or a polarization rotating plate 409, e.g., instead of dichroic mirror 306, as described below.

According to some demonstrative embodiments of the invention, the light beam transmitted by mirror 304, e.g., the s-polarization red-yellow light beam, may pass through selective rotator 406. Selective rotator 406 may rotate the polarization of the fourth primary color light beam, e.g., the yellow light beam, from s-polarization to p-polarization; while maintaining the s-polarization of the third primary color light beam, e.g., the red light beam. Selective rotator 406 may include any suitable color-selective rotator, e.g., the ColorSelect® rotator manufactured by ColorLink, Inc., 5335 Sterling Dr Suite B, Boulder, Colo., 80301, USA.

According to some demonstrative embodiments of the invention, PBS 408 may separate the s-polarized light, e.g., the red light, from the p-polarized light, e.g., the yellow light, received from rotator 406. For example, PBS 408 may reflect the third primary color light beam, e.g., the red light beam, and transmit the fourth primary color light beam, e.g., the yellow light beam. PBS 408 may include any suitable beam splitter, e.g., the Moxtek PBS manufactured by MOXTEK, Inc. 452 West 1260 North Orem, Utah 84057, USA.

According to some demonstrative embodiments of the invention, plate 409 may rotate the polarization of the fourth primary color light beam, e.g., the yellow light beam, back to the s-polarization. For example, plate 409 may include a λ/2 polarization rotation plate, e.g., as is known in the art.

It will be appreciated by those of ordinary skill in the art that the transmission/reflection properties of selective rotator 406, and/or PBS 408 may be substantially uniform for different angles of incidence, and thus may result in a relatively uniform color across the third and fourth primary color light beams, e.g., the red and yellow light beams.

Figure 5:
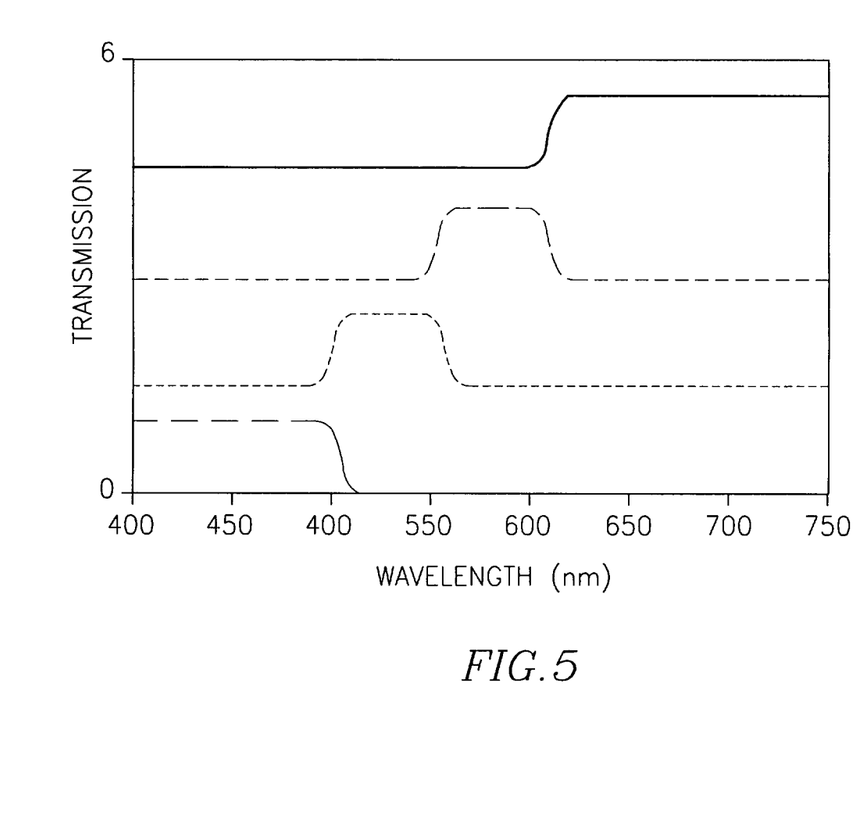
FIG. 5 is a schematic illustration of graphs of four demonstrative primary color wavelength spectra, which may be implemented by the display devices of FIGS. 3 and/or 4.

FIG. 5 schematically illustrates graphs of four exemplary primary color wavelength spectra, which may be implemented by a color display including the combining arrangement of FIG. 3, or FIG. 4.

FIG. 5 shows the wavelength spectra of a set of four primary colors, which may be produced by dichroic coatings, for example, coatings of dichroic mirrors 302, 304 and 306 of FIG. 3, and/or of the dichroic-coated surfaces of FIG. 4.

According to some demonstrative embodiments of the invention, the specific color choices of the primary color wavelength ranges shown in FIG. 5 may result in significantly wider color gamut and/or image brightness, compared to prior art RGB color display devices, as described below.

Figure 6:
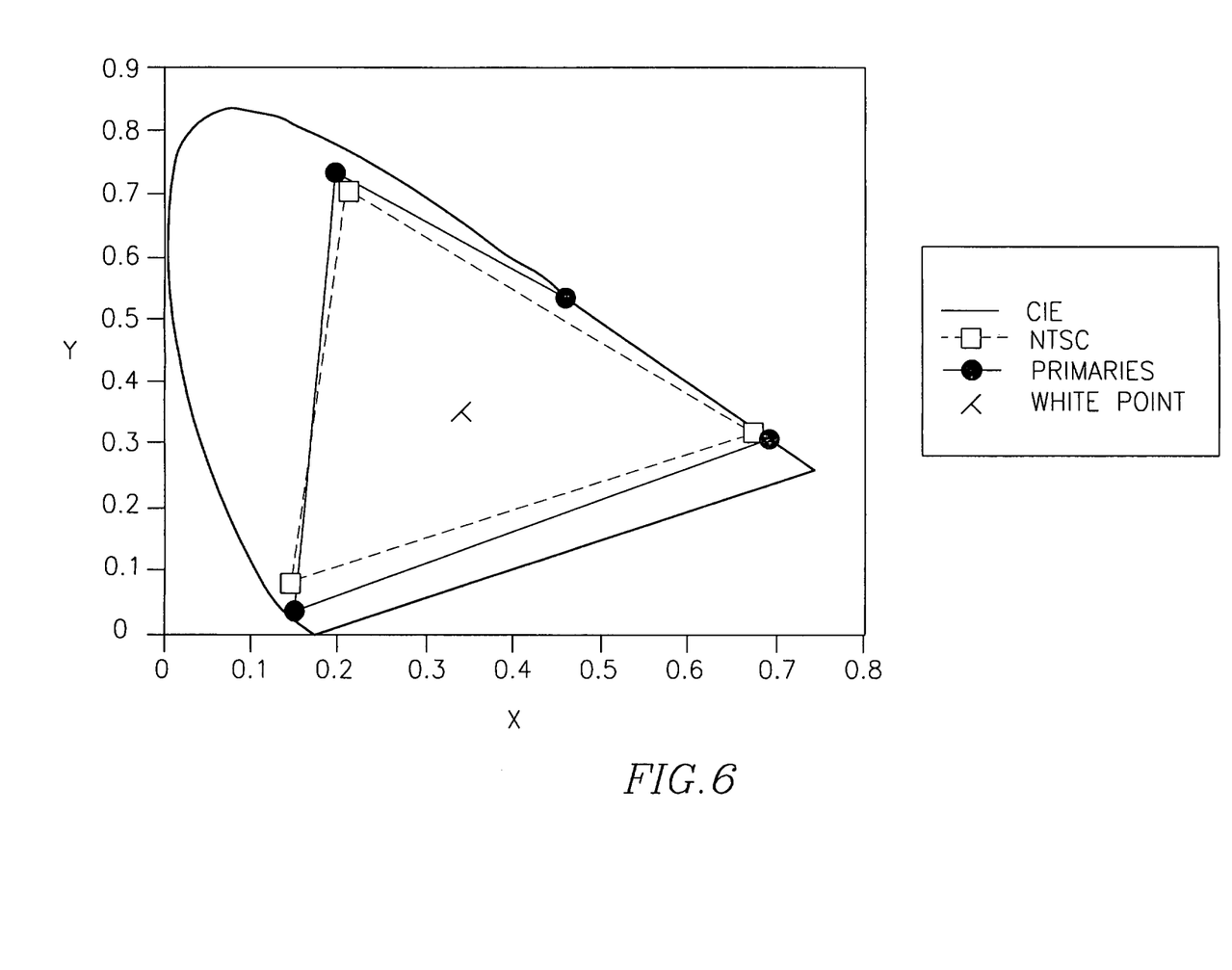
FIG. 6 is a schematic illustration of a chromaticity diagram representing a color gamut resulting from the primary color spectra of FIG. 5.

FIG. 6 schematically illustrates a chromaticity diagram representing the resulting color gamut of the primary color spectra of FIG. 7.

As clearly shown in FIG. 6, the color gamut produced by a theoretical NTSC gamut display is substantially covered by the gamut of the four primary colors of FIG. 5. As further shown in FIG. 6, the white point coordinates obtained by the sum of all primaries are x=0.313 and y=0.329. The luminance values for the colors obtained by this configuration are in general equal to or higher than the luminance values that can be obtained for the same colors from a theoretical NTSC gamut display. Thus, in general, all the colors that can be reproduced by a theoretical NTSC gamut display are also reproducible by the primary color selections of FIG. 5, both in terms of color coordinates and in terms of intensity.

It should be appreciated that although the primary color selections of FIG. 5 provide desirable results in terms of image color and brightness, there may be other suitable selections of four primary colors that provide similar (or even better) results, in accordance with specific implementations.

Some demonstrative embodiments of the invention may relate to methods and/or devices of displaying a color image using four primary colors, e.g., as described above with reference to FIGS. 3-6. However, it will be appreciated by those of ordinary skill in the art that other embodiments of the invention may be implemented for displaying a color image using more than four primary colors. For example, it will be appreciate by those skilled in the art that the devices of FIGS. 3 and/or 4 may be modified to enable displaying a color image using five or more primary colors, e.g., in analogy to the devices described in International Application No. PCT/IL2004/000711, International Filing Date Aug. 3, 2004, published Feb. 10, 2005 as International publication number WO 2005/013193, the entire disclosure of which is incorporated herein by reference.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

The invention claimed is:

1. A display device of producing a color image using four or more primary colors, the device comprising:
   a polarization conversion system, the polarization conversion system converting light from an illumination unit to have a first polarization state;
   four or more transmissive spatial light modulators to modulate four or more, respective, primary color light beams in accordance with four or more, respective, primary color image components of the color image to produce four or more, respective, modulated light beams, wherein the four or more primary color light beams include a green color light beam and only a spatial light modulator for a green color light beam rotates a polarization of the green color light beam to be a second polarization state; and
   a beam combiner to combine the four or more modulated light beams into a combined light beam carrying the color image, the-beam combiner comprising:
   an X-cube to jointly direct three of the four or more modulated light beams according to polarization state; and
   a selective color rotator disposed on a light emitting surface of the X-cube to rotate the polarization of two of the three modulated light beams, while maintaining the polarization of a third one of the three modulated light beams, which is the green color,
   wherein each of three side surfaces of the X-cube receives the three of four or more modulated light beams having the spectral ranges corresponding to the first primary color, the second primary color and the third primary color respectively.

2. The device of claim 1, wherein the combiner comprises a dichroic polarizing beam splitter to combine a fourth modulated light beam of the four or more modulated light beams with the three modulated light beams.

3. The device of claim 1, wherein at least one of the transmissive spatial light modulators comprises a transmissive liquid crystal display panel.

4. The device of claim 1, wherein the four or more primary color light beams have the spectral ranges corresponding to the four or more primary colors, respectively.

5. The device of claim 1, wherein the four or more primary colors comprise at least blue, green, red and yellow.

6. The device of claim claim 1, further comprising a spectrum-splitting arrangement to split light of an illumination source into the four or more primary color light beams.

7. The device of claim 6, wherein the spectrum-splitting arrangement comprises a plurality of dichroic mirrors to separate light of the illumination source into the four or more primary color light beams.

8. The device of claim 6, wherein the spectrum splitting arrangement comprises:
   a second selective color rotator to rotate the polarization of a first part of the light of the illumination source having the spectral range corresponding to the first primary color of the four or more primary colors, and to maintain the polarization of a second part of the light of the illumination source having the spectral range corresponding to the second primary color of the four or more primary colors; and
   a polarized beam splitter to reflect the first part of the light, and to transmit the second part of the light.

9. The device of claim 6, further comprising one or more folding mirrors to direct one or more of the four or more primary color light beams onto one or more of the transmissive spatial light modulators.

10. The device of claim 1, wherein the four or more modulated light beams travel substantially the same distance in the combiner.

11. The device of claim 1, further comprising a projection lens to project the combined light beam onto a screen.

12. The device of claim 1, further comprising a controller to separately activate each of the four or more spatial light modulators to produce four or more respective transmissive patterns corresponding to four or more primary components, respectively, of a signal representing the color image.

13. The device of claim 12, further comprising a converter to convert a three-primary color input signal into the signal representing the color image.

14. The device of claim 1, wherein the selective color rotator rotates polarization of the two of the three modulated light beams to have a same polarization.

15. The device of claim 14, wherein the selective color rotator is a green-magenta rotator.

16. A method of producing a color image using four or more primary colors comprising:
   converting light from a illumination unit to have a first polarization state;
   modulating four or more primary color light beams using four or more, respective, transmissive spatial light modulators in accordance with four or more, respective, primary color image components of the color image to produce four or more, respective, modulated light beams, wherein the four or more primary color light beams include a green color light beam and only a spatial light modulator for a green color light beam rotates a polarization of the green color light beam to be a second polarization state; and
   combining the four or more modulated light beams into a combined light beam carrying the color image, the combining comprising:
   jointly directing three of the four or more modulated light beams using a X-cube according to polarization state; and
   selectively rotating the polarization of two of the three modulated light beams emitted from the X-cube, while maintaining the polarization of a third one of the three modulated light beams,
   wherein each of three side surfaces of the X-cube receives the three of the four or more modulated light beams having spectral ranges corresponding to a first primary color, a second primary color and a third primary color respectively.

17. The method of claim 16, wherein the combining comprises combining a fourth modulated light beam of the four or more modulated light beams with the three modulated light beams.

18. The method of claim 16, further comprising splitting light of the illumination unit into the four or more primary color light beams.

19. The method of claim 16, wherein selective color rotator rotates polarization of the two of the three modulated light beams to have a same polarization.

20. The method of claim 19, wherein the selectively rotating the polarization is performed by a green-magenta rotator.

* * * * *